(12) United States Patent
Kim et al.

(10) Patent No.: US 10,818,980 B2
(45) Date of Patent: Oct. 27, 2020

(54) BATTERY PACK

(71) Applicant: Samsung SDI Co., Ltd., Yongin-si, Gyeonggi-do (KR)

(72) Inventors: Junyoung Kim, Yongin-si (KR); Eungyeong Gu, Yongin-si (KR); Seungwoo Yang, Yongin-si (KR); Kyungho Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 156 days.

(21) Appl. No.: 16/198,315

(22) Filed: Nov. 21, 2018

(65) Prior Publication Data
US 2019/0181508 A1 Jun. 13, 2019

(30) Foreign Application Priority Data

Dec. 11, 2017 (KR) .................... 10-2017-0169537

(51) Int. Cl.
*H01M 10/42* (2006.01)
*H01M 2/10* (2006.01)
*H01M 10/48* (2006.01)
*H01M 2/20* (2006.01)

(52) U.S. Cl.
CPC ....... *H01M 10/425* (2013.01); *H01M 2/1077* (2013.01); *H01M 2/206* (2013.01); *H01M 10/48* (2013.01); *H01M 2010/4278* (2013.01); *H01M 2220/20* (2013.01)

(58) Field of Classification Search
CPC combination set(s) only.
See application file for complete search history.

(56) References Cited

U.S. PATENT DOCUMENTS 5,336,953 A * 8/1994 Allemann ................. B25F 5/02
173/217
5,578,794 A * 11/1996 Lamb ...................... E05C 19/06
174/535

(Continued)

FOREIGN PATENT DOCUMENTS

JP          3702211 B2    10/2005
JP       2013-114782 A     6/2013

(Continued)

OTHER PUBLICATIONS

Korean Office Action dated Mar. 16, 2020, for corresponding Korean Patent Application No. 10-2017-0169537 (6 pages).

*Primary Examiner* — Kaity V Chandler
(74) *Attorney, Agent, or Firm* — Lewis Roca Rothgerber Christie LLP

(57) ABSTRACT

A battery pack includes: a plurality of battery cells; a plurality of frames each between two adjacent battery cells among the battery cells in a direction, the frames coupled to and facing each other; and a wiring substrate mounted on the frames and configured to collect status information of the battery cells from the battery cells, and each of the frames includes a latching protrusion and a tensioner which protrude therefrom and press against an upper surface and a lower surface of the wiring substrate, respectively. The battery pack has an improved structure in which the position of the wiring substrate for obtaining and collecting status information of the plurality of battery cells may be stably fixed.

16 Claims, 8 Drawing Sheets

(56) References Cited

U.S. PATENT DOCUMENTS

| | | | | |
|---|---|---|---|---|
| 7,274,554 | B2* | 9/2007 | Kang | H01M 2/1066 361/679.01 |
| 8,771,862 | B2 | 7/2014 | Kim et al. | |
| 8,920,955 | B1* | 12/2014 | Chuang | H01M 2/1077 429/7 |
| 2003/0031920 | A1* | 2/2003 | Hoffman | H01M 2/26 429/66 |
| 2006/0166083 | A1* | 7/2006 | Zhang | H01M 2/1066 429/97 |
| 2006/0176012 | A1* | 8/2006 | Lee | H04M 1/0262 320/107 |
| 2007/0020497 | A1* | 1/2007 | Ryoichi | H01M 8/04089 429/410 |
| 2008/0050650 | A1* | 2/2008 | Hara | H01M 2/0202 429/179 |
| 2010/0047676 | A1* | 2/2010 | Park | H01M 10/643 429/93 |
| 2010/0304203 | A1* | 12/2010 | Buck | H01M 10/049 429/120 |
| 2011/0229745 | A1* | 9/2011 | Barter | H01M 10/486 429/90 |
| 2011/0256446 | A1* | 10/2011 | Bronczyk | H01M 10/6566 429/163 |
| 2013/0164569 | A1* | 6/2013 | Srinivasan | H01M 2/1077 429/7 |
| 2013/0224523 | A1* | 8/2013 | Nam | H01M 2/024 429/7 |
| 2013/0302651 | A1 | 11/2013 | Kim et al. | |
| 2013/0314880 | A1* | 11/2013 | Sun | H02J 7/0044 361/730 |
| 2014/0242449 | A1* | 8/2014 | Lee | H01M 2/1016 429/176 |
| 2014/0272515 | A1* | 9/2014 | Maguire | B60L 58/26 429/120 |
| 2015/0093608 | A1* | 4/2015 | Seong | H01M 2/0267 429/56 |
| 2015/0255774 | A1* | 9/2015 | Menzies | H01M 2/206 429/121 |
| 2015/0303415 | A1* | 10/2015 | Kayano | H01M 2/1022 429/159 |
| 2016/0036018 | A1* | 2/2016 | Gunna | H01M 10/6555 429/100 |
| 2016/0036019 | A1* | 2/2016 | Gunna | B60L 50/64 429/50 |
| 2016/0111691 | A1* | 4/2016 | Garascia | H01M 10/613 429/99 |
| 2016/0172641 | A1* | 6/2016 | Zahn | B25F 5/02 429/97 |
| 2016/0211492 | A1* | 7/2016 | Cho | H01M 2/1016 |
| 2017/0025717 | A1* | 1/2017 | Zeller | H01M 2/204 |
| 2017/0096079 | A1* | 4/2017 | Yokote | F04D 29/444 |
| 2017/0187018 | A1* | 6/2017 | Pflueger | H01M 2/1223 |
| 2017/0207431 | A1* | 7/2017 | Lienkamp | H01M 2/202 |
| 2017/0256760 | A1* | 9/2017 | Nietling | H01M 10/647 |
| 2017/0338454 | A1* | 11/2017 | Millon | H01M 2/024 |
| 2017/0338520 | A1* | 11/2017 | Lim | H01M 10/425 |
| 2017/0365888 | A1* | 12/2017 | Kwon | H01M 10/613 |
| 2018/0169851 | A1* | 6/2018 | Radovich | H02J 7/0021 |
| 2018/0198110 | A1* | 7/2018 | Zeng | H01M 2/348 |
| 2019/0027731 | A1* | 1/2019 | Zeng | H01M 2/1077 |
| 2020/0112012 | A1* | 4/2020 | Fernandez-Galindo | H01B 1/026 |

FOREIGN PATENT DOCUMENTS

| | | |
|---|---|---|
| KR | 10-1146677 B1 | 5/2012 |
| KR | 10-2013-0125334 A | 11/2013 |
| KR | 10-2017-0025524 A | 3/2017 |
| KR | 10-2017-0054881 A | 5/2017 |

* cited by examiner

BATTERY PACK

CROSS-REFERENCE TO RELATED APPLICATION

This application claims priority to and the benefit of Korean Patent Application No. 10-2017-0169537, filed on Dec. 11, 2017 in the Korean Intellectual Property Office, the entire disclosure of which is incorporated herein by reference.

BACKGROUND

1. Field

Aspects of one or more embodiments relate to a battery pack.

2. Description of the Related Art

In general, secondary batteries are chargeable and dischargeable unlike non-rechargeable primary batteries. Secondary batteries are used as energy sources, such as for mobile devices, electric vehicles, hybrid vehicles, electric bicycles, and uninterruptible power supplies, and may be used in the form of a single battery cell or a battery pack in which a plurality of batteries cells are connected together, according to a type of an external device to which the secondary battery is applied.

Small mobile devices, such as mobile phones, may operate for a time (e.g., a predetermined time) with the power output and capacity of a single battery. However, when long-time or high-power driving is required, as in a power-consuming electric vehicle or hybrid vehicle, a battery pack is preferred due to the requirement for high power or capacity. The output voltage or output current of the battery pack may be increased according to the number of battery cells installed in the battery pack.

SUMMARY

According to an aspect of one or more embodiments, a battery pack has an improved structure in which the position of a wiring substrate for obtaining and collecting status information of a plurality of battery cells may be stably fixed.

Additional aspects will be set forth, in part, in the description which follows and, in part, will be apparent from the description, or may be learned by practice of the presented embodiments.

According to one or more embodiments, a battery pack includes: a plurality of battery cells; a plurality of frames each interposed between two adjacent battery cells among the battery cells in a direction, wherein the frames are coupled to and face each other; and a wiring substrate mounted on the frames and configured to collect status information of the battery cells from the battery cells, wherein each of the frames includes a latching protrusion and a tensioner which protrude therefrom and press against an upper surface and a lower surface of the wiring substrate, respectively.

In one or more embodiments, the wiring substrate may include a plurality of latching portions into which the latching protrusions of the frames are fitted.

In one or more embodiments, a latching portion of the plurality of latching portions may include a hole, and the latching protrusion presses against the upper surface of the wiring substrate through the latching portion.

In one or more embodiments, the latching protrusion and the tensioner may directly face each other and be provided at locations close to each other.

In one or more embodiments, the latching protrusion and the tensioner may be provided together eccentrically located to the left or right of a center position of each of the frames.

In one or more embodiments, the frames may be arranged in a pattern that reverses between left and right along the direction, and the locations of the latching protrusion and the tensioner in each of the frames may alternate between left and right positions along the direction.

In one or more embodiments, the latching portions into which the latching protrusions are fitted may be alternately formed at left and right edge positions of the wiring substrate along a direction in which the wiring substrate extends.

In one or more embodiments, the latching protrusions of adjacent frames among the frames arranged in the direction may move away from each other along the direction as the batteries swell.

In one or more embodiments, the wiring substrate may include latching portions into which the latching protrusions of the frames are fitted, and widths of the latching portions in the direction may gradually increase and have cumulatively increasing tolerances with increasing distance from a central reference line bisecting the plurality of battery cells arranged in the direction.

In one or more embodiments, the latching protrusion and the tensioner may be integrally formed with each of the frames.

In one or more embodiments, the tensioners may include a plastic material.

In one or more embodiments, the tensioner may be in contact with the lower surface of the wiring substrate.

In one or more embodiments, the tensioner may include a first end portion fixed to the frame, and a second end portion which presses against the lower surface of the wiring substrate, and the tensioner may extend with a curved shape from the first end portion to the second end portion.

In one or more embodiments, the tensioner may include an elongated member having a length and a width in which the length is longer than the width, and the tensioner may elastically press against the lower surface of the wiring substrate.

In one or more embodiments, each of the frames may include: a substrate support portion on which the wiring substrate is mounted; and a bus bar support portion on either one of a left side and a right side of the substrate support portion.

In one or more embodiments, the bus bar support portion may have a relatively small width with respect to that of the substrate support portion.

BRIEF DESCRIPTION OF THE DRAWINGS

These and/or other aspects will become apparent and more readily appreciated from the following description of some embodiments, taken in conjunction with the accompanying drawings in which.

DETAILED DESCRIPTION

Figure 1:
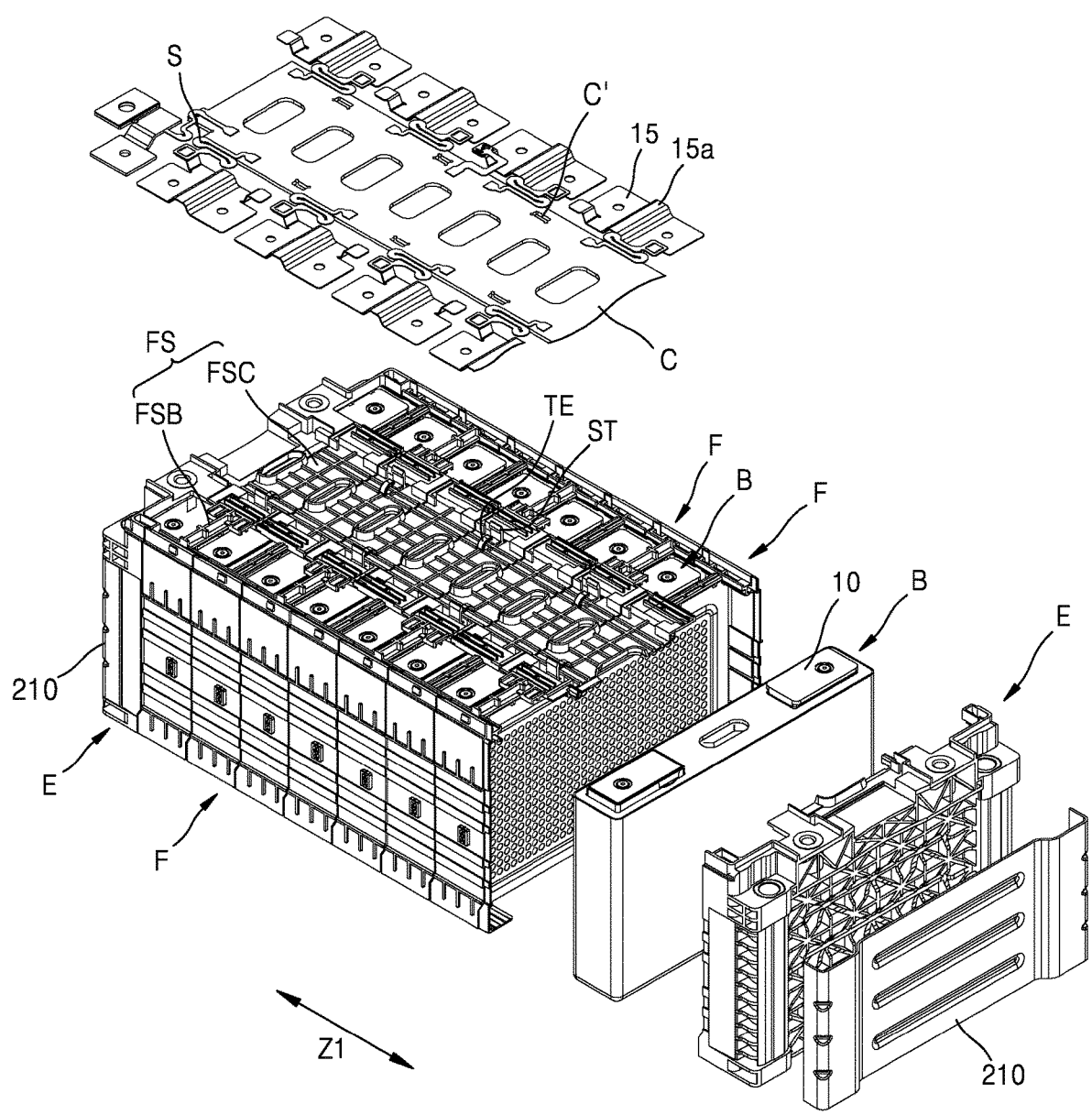
FIG. 1 is an exploded perspective view of a battery pack according to an embodiment.

Reference will now be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Herein, embodiments of a battery pack according to the inventive concept will be described with reference to the accompanying drawings.

Figure 2:
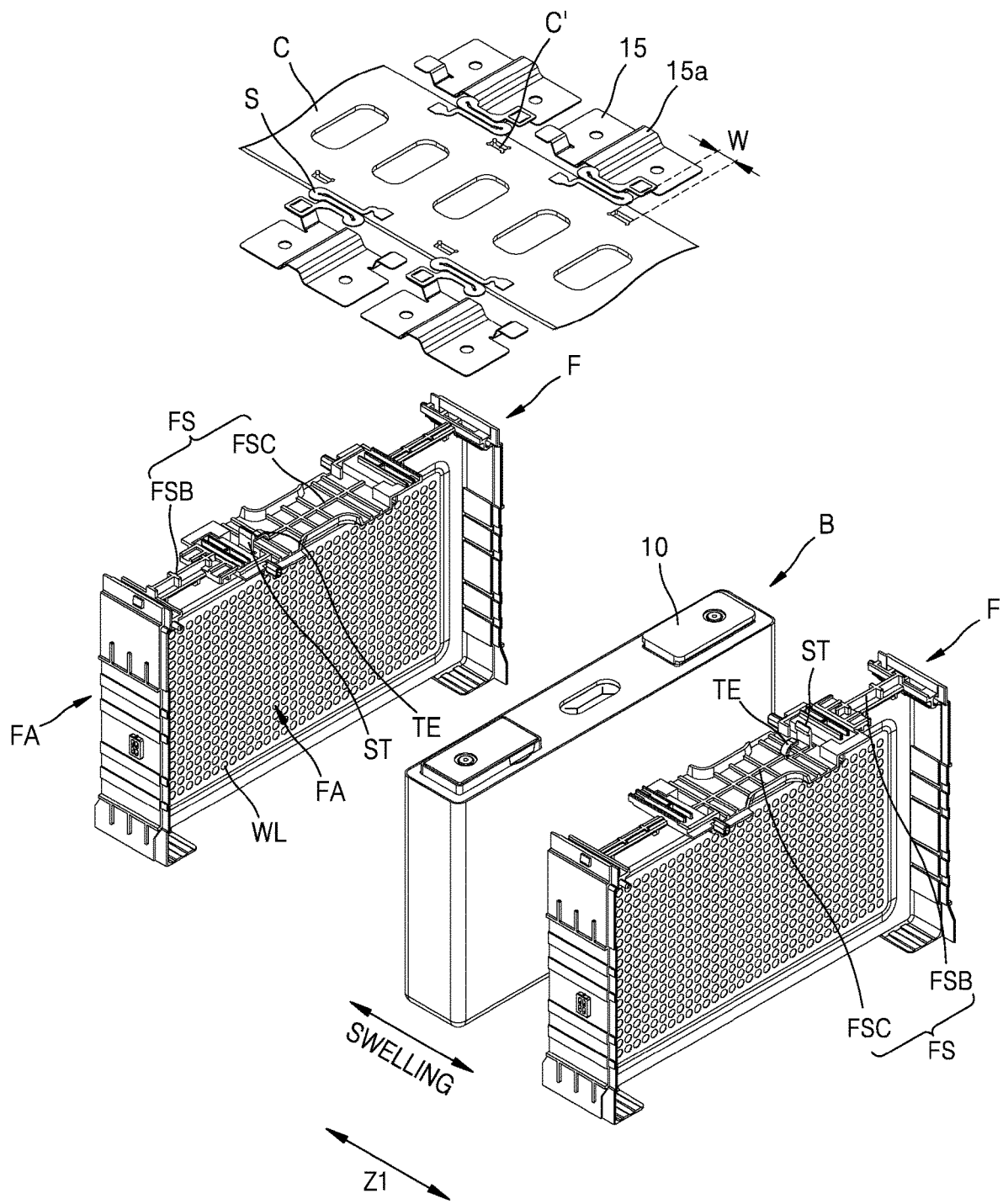
FIG. 2 is a partial exploded perspective view of the battery pack of FIG. 1.

FIG. 1 is an exploded perspective view of a battery pack according to an embodiment; FIG. 2 is a partial exploded perspective view of the battery pack of FIG. 1; and FIG. 3 is a partial top view of the battery pack of FIG. 1.

Figure 3:
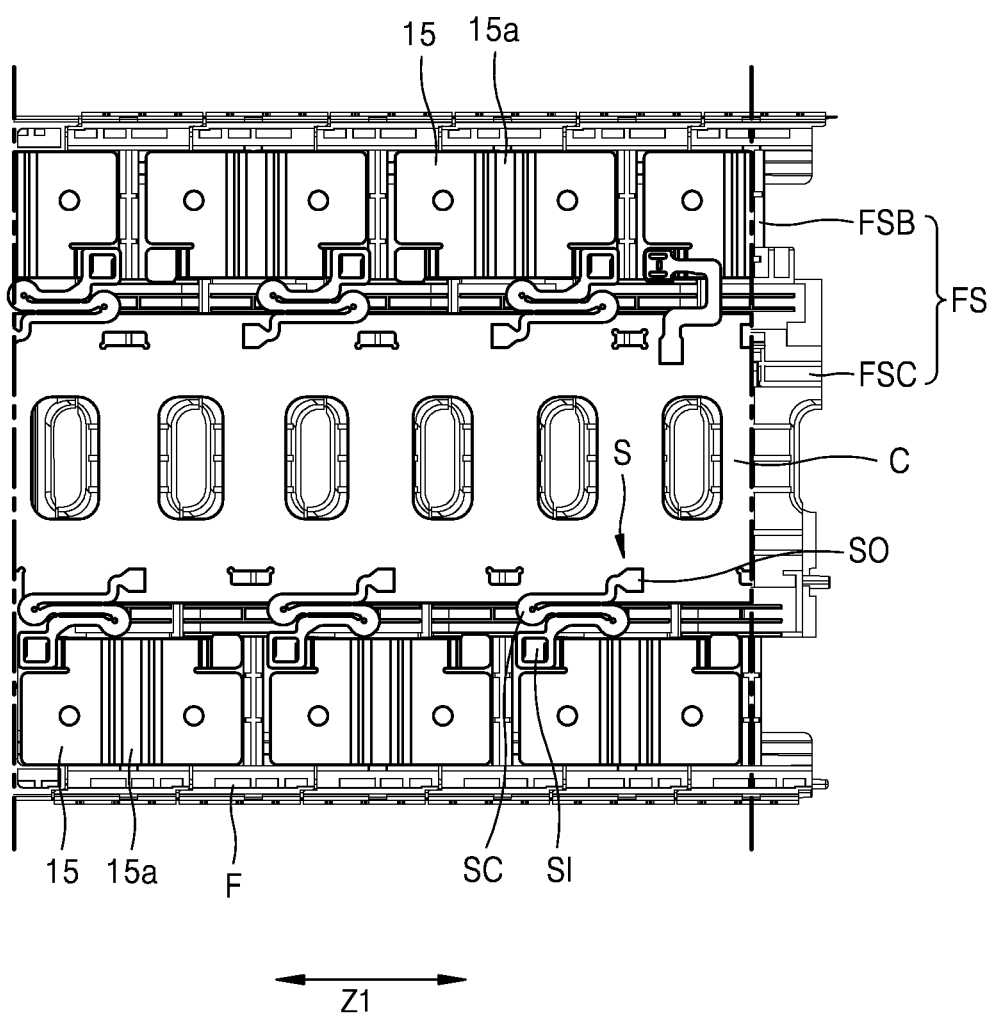
FIG. 3 is a partial top view of the battery pack of FIG. 1.

Referring to FIGS. 1, 2, and 3, a battery pack according to one or more embodiments may include battery cells (B), a plurality of frames (F) each interposed between two adjacent battery cells (B) in a direction (Z1 direction), and a wiring substrate (C) mounted on the frames (F), wherein the wiring substrate (C) may be configured to collect status information of the battery cells (B) from the battery cells (B).

The battery cells (B) may be arranged in a direction (Z1 direction). The plurality of frames (F) may be arranged alternately with the battery cells (B) in the direction (Z1 direction) and connected to each other. For example, the frames (F) may be arranged in the direction (Z1 direction) alternately with the battery cells (B), wherein adjacent frames (F) may be connected together facing each other with one battery cell (B) interposed therebetween.

In an embodiment, the frame (F) may surround an outer periphery of the battery cell (B) to accommodate the battery cell (B), defining an accommodating portion (FA) which extends along the outer periphery of the battery cell (B) to receive the battery cell (B) therein. In an embodiment, the frame (F) may extend along the outer periphery of the battery cell (B) over upper, lower, left, and right side portions of the battery cell (B). The frame (F) may include the accommodating portion (FA) which is an inner portion of the frame (F) for accommodating the battery cell (B) inside the frame (F), and a support portion (FS) which is an outer portion of the frame (F) for supporting objects that may be electrically connected to the battery cell (B), for example, a bus bar 15 and the wiring substrate (C). For example, the support portion (FS) may be provided in a portion of the frame (F) extending over the upper side portion of the battery cell (B) in which an electrode 10 is disposed. The frame (F) may surround the battery cells (B) inside the frame (F) and may form the support portions (FS) to provide an external base for supporting objects that may be electrically connected with the battery cell (B), for example, the bus bar 15 and the wiring substrate (C).

In an embodiment, the frames (F) may be arranged in a direction (Z1 direction) with a battery cell (B) interposed between every two adjacent frames (F), wherein the adjacent frames (F) may be connected together facing each other. In other words, each battery cell (B) may be surrounded by the adjacent frames (F) that are arranged to the front and rear of the battery cell (B) in the direction (Z1 direction), wherein the adjacent frames (F) arranged to the front and rear of each of the battery cells (B) may surround the outer periphery of the battery cell (B) to form an externality covering the battery cell (B) as a housing protecting the battery cell (B). In the entire battery pack including the plurality of battery cells (B), an array of the frames (F) arranged in a direction (Z1 direction) may substantially form an externality of the battery pack, wherein the battery cells (B) may be accommodated inside the array of the frames (F) by being surrounded by the frames (F).

The frames (F) may be arranged in a direction (Z1 direction) alternately with the battery cells (B), wherein each of the frames (F) may include accommodating portions (FA) that may accommodate different battery cells (B) adjacent to the frame (F), respectively. For example, each frame (F) may include the accommodating portions (FA) arranged in a direction (Z1 direction) to the front and rear of the frame (F), respectively. The accommodating portions (FA) may be separated from one another by a partition wall (WL). The partition wall (WL) of the frame (F) may partition the accommodating portions (FA) from one another and may block electrical and thermal interference between the different battery cells (B) received in the accommodating portions (FA).

For electrical connection with adjacent other battery cells (B), the battery cells (B) may be connected to the bus bars 15. To acquire status information of the battery cells (B), such as voltages or temperatures of the battery cells (B), and collect the status information of the battery cells (B), the battery cells (B) may be connected to the wiring substrate (C). For example, the bus bars 15 and the wiring substrate C may be objects that form electrical connections with the battery cells (B). These objects may be supported on the support portions (FS) of the frames (F).

In an embodiment, the support portion (FS) of frame (F) may include a bus bar support portion (FSB) on which the bus bar 15 may be supported, and a substrate support portion (FSC) on which the wiring substrate (C) may be mounted and supported. The bus bar support portion (FSB) and the substrate support portion (FSC) may be provided at different positions of the support portion (FS). For example, the bus bar support portion (FSB) may be formed at a left side (e.g., left edge) or right side (e.g., right edge) position of the frame (F) such as to correspond to the electrode 10 of the battery cell (B). In an embodiment, the substrate support portion (FSC) may be formed at a center position of the frame (F). In an embodiment, the wiring substrate (C) supported on the substrate support portions (FSC) of the frames (F) may be located at center positions of the plurality of battery cells (B) to easily collect status information of the battery cells (B) from the different sites of the plurality of battery cells (B). The wiring substrate (C) may be connected to sensing portions (S) to acquire status information from the battery cells (B). In an embodiment, the wiring substrate (C) may be located at the center positions of the battery cells (B), such that distances from the wiring substrate (C) to the sensing portions (S) connected to a plurality of sites of the battery cells (B) may be substantially equal, and electrical resistances of the sensing portions (S) connected to the plurality of sites may be balanced to prevent or substantially prevent a signal distortion.

In an embodiment, the bus bar support portion (FSB) and the substrate support portion (FSC) may have different widths. For example, the bus bar support portion (FSB) may have a relatively small width so as not to interrupt electrical connection between the bus bar 15 and the battery cell (B) and, in particular, the electrode 10 of the battery cell (B). The bus bar support portion (FSB) may support front and rear end portions of the bus bar 15, each bus bar 15 having opposite front and rear end portions with a bent portion 15a located at a center portion thereof, and may insulate the adjacent bus bars 15 from one another. The bus bar support portion (FSB) may support the opposite front and rear end portions of the adjacent bus bars 15, and may electrically insulate the adjacent bus bars 15 from one another to prevent or substantially prevent contacting of the opposite end portions of the bus bar 15 to end portions of other adjacent bus bars 15. In an embodiment, the bus bar support portion (FSB) may need not physically contact the opposite end portions of the adjacent bus bars 15, as long as it is disposed between the adjacent bus bars 15 such as to provide electrical insulation between the adjacent bus bars 15. The bus bar support portion (FSB) may have a relatively small width so as not to narrow a current carrying area between the bus bar 15 and the electrode 10 of the battery cell (B), and may be interposed between the adjacent bus bars 15 to prevent or substantially prevent electrical contact between the adjacent bus bars 15. When the bus bar support portion (FSB) has a width as large as the substrate support portion (FSC), the bus bar support portion (FSB) may hinder electrical contact between the bus bar 15 and the battery cell (B) and, in particular, the electrode 10 of the battery cell (B), and may restrict the current carrying area between the bus bar 15 and the battery cell (B) to be narrow, such that the entire electrical resistance of charge and discharge paths may be increased, and the electrical output may be lowered.

In an embodiment, a pair of bus bar support portions (FSB) may be formed along a left edge portion and a right edge portion of the support portion (FS) to correspond to either one of the electrodes 10 that are disposed in left and right edge portions along a width direction of the battery cell (B). In an embodiment, the frames (F) may be arranged in a direction (Z1 direction) with a pattern that reverses between left and right such that the bus bar support portions (FSB) of the frames (F) alternate between the left and right edge portions along the direction (Z1 direction). For example, the bus bar support portion (FSB) may be formed on either one of the left and right portions with respect to the substrate support portion (FSC) formed at the center portion of each frame. Accordingly, as the plurality of frames (F) are arranged with a pattern that reverses between left and right along a direction (Z1 direction), the bus bar support portions (FSB) of the frames (F) may be arranged to alternate between the left and right portions of the substrate support portions (FSC) of the frames (F) in the direction (Z1 direction).

In an embodiment, the substrate support portion (FSC) may have a relatively large width so as to stably mount and support the wiring substrate (C) thereon. The wiring substrate (C) may be mounted over the substrate support portions (FSC) of the frames (F), wherein the substrate support portions (FSC) of the frames (F) may be connected to one another in a direction (Z1 direction), forming a support surface extending along the direction (Z1 direction) to provide a support base for supporting the entire wiring substrate (C). That is, the substrate support portion (FSC) of each frame (F) may support the wiring substrate (C), wherein the substrate support portions (FSC) of the frames (F) may be connected to one another along the direction (Z1 direction) to form the support surface extending along the direction (Z1 direction), providing a stable support base for the entire wiring substrate (C).

The bus bars 15, which are for electrical connection of adjacent battery cells (B), may connect the adjacent battery cells (B) in a series or parallel manner or in a combination of series and parallel manners. The bus bars 15 may electrically connect the adjacent battery cells (B) by electrically connecting the electrodes 10 of the adjacent battery cells (B). In particular, the bus bars 15 may connect the adjacent battery cells (B) in a parallel manner by connecting the same polarities of the electrodes 10 of the adjacent battery cells (B) or in a series manner by connecting the opposite polarities of the electrodes 10 of the adjacent battery cells (B).

In an embodiment, the bus bars 15 may be placed to face the electrodes 10 on the upper surfaces of the battery cells (B) and may connect the electrodes 10 of the adjacent battery cells (B). In an embodiment, the opposite end portions of each bus bar 15 with respect to the bent portion 15a formed at the center of the bus bar 15 may be placed facing the electrodes of the adjacent battery cells (B) and connected thereto. The plurality of bus bars 15 may respectively connect the electrodes 10 of pairs of adjacent battery cells (B).

The substrate support portion (FSC) may be provided at a center position between the bus bar support portions (FSB) in the left and right edge portions. The wiring substrate (C) may be mounted on the substrate support portion (FSC). The wiring substrate (C) may include a plurality of conductive patterns (not shown) for collecting status information of the battery cells (B) and transmitting the collected status information to a battery management unit (not shown). The wiring substrate (C) may be electrically connected to a plurality of battery cells (B). For example, the wiring substrate (C) may be connected to the bus bars 15, which electrically connect the adjacent battery cells (B), in order to obtain voltage information of the battery cells (B). In some embodiments, although not shown, the wiring substrate (C) may be connected to thermisters (not shown) located at the upper surfaces of the battery cells (B) to obtain temperature information of the battery cells (B).

The wiring substrate (C) may transmit the status information obtained from the plurality of battery cells (B), for example, voltage and temperature information of the battery cells (B), to a battery management unit (not shown) and the battery management unit (not shown) may control charging and discharging operation of the battery cells (B). In some embodiments, the wiring substrate (C) may control the charging and discharging operation of the batteries based on the status information together with the battery management unit (not shown).

In an embodiment, a flexible sensing portion (S) that may mediate transfer of a signal on the status information of the battery cells (B) may be connected to the wiring substrate (C). In an embodiment, the sensing portion (S) may be provided in the form of a flexibly deformable film. Although not illustrated, the sensing portion (S) may include an insulating film (not shown) and a conductive wire (not shown) provided on the insulating film. For example, the conductive wire may be formed as a copper foil pattern. The insulating film may be arranged to bury the conductive wire to insulate an electrical signal transmitted through the conductive wire from the outside.

In an embodiment, the sensing portion (S) may include an input portion (SI) connected to a battery cell (B) side (for example, the bus bar 15 electrically connected to the battery cell (B)), an output portion (SO) connected to the wiring substrate (C), and a connection portion (SC) that connects the input portion (SI) and the output portion (SO). For example, the input portion (SI) may correspond to a site on the battery cell (B) (for example, on the bus bar 15 electrically connected to the battery cell (B)) to which the status information of the battery cell (B) is input. For example, the output portion (SO) may correspond to a site from which the status information of the battery cell (B) is output to the wiring substrate (C).

In particular, the input portion (SI) of the sensing portion (S) may be connected to a battery cell (B) side. That is, the input portion (SI) of the sensing portion (S) may be connected to a bus bar 15 that may electrically connect the adjacent battery cells (B), and may receive a voltage signal of the battery cell (B) from the bus bar 15. In some embodiments, although not illustrated, the input portion (SI) may be connected to a thermister (not shown) disposed on the upper surface of the battery cell (B) and may receive a temperature signal of the battery cell (B) from the thermister. In an embodiment, the input portion (SI) of the sensing portion (S) is connected to a signal input portion for acquiring status information of the battery cell (B). The signal input portion, which may be connected to the battery cell (B) in order to acquire status information such as voltage or temperature of the battery cell (B), may be, for example, a bus bar 15 electrically connected to the battery cell (B) or a thermister (not shown) thermally connected to the battery cell (B). In an embodiment, the input portion (SI) and the signal input portion (for example, the bus bar 15) on the battery cell (B) side may be bound together by welding. For example, after the input portion (SI) is mounted on the bus bar 15, the input portion (SI) may then be ultrasonically welded onto the bus bar 15 by pressing on an ultrasonic horn (not shown) to which ultrasonic vibrations are applied. In some embodiments, the input portion (SI) and the signal input portion (for example, the bus bar 15) on the battery cell (B) side may be bound together by using, for example, a conductive adhesive.

The output portion (SO) of the sensing portion (S) may be connected to a pad (not shown) of the wiring substrate (C). An electrical signal transmitted through the output portion (SO) of the sensing portion (S) may be transmitted to a conductive pattern (not shown) on the wiring substrate (C) through the pad of the wiring substrate (C). In an embodiment, the output portion (SO) of the sensing portion (S) may be connected to the pad of the wiring substrate (C) by welding or soldering, or by using a conductive adhesive.

In an embodiment, the connection portion (SC) for connecting the input portion (SI) with the output portion (SO) may be formed to have a curved shape including curved portions overlapping with each other. The battery pack according to one or more embodiments may include frames (F) disposed in a direction (Z1 direction) in which the battery cells (B) are arranged, wherein the frames (F) may be bound together facing each other with a battery cell (B) therebetween. The battery cell (B) may experience swelling in the direction (Z1 direction) in accordance with charging and discharging operations. The frames (F) coupled to the battery cells (B) on either side of each battery cell (B) in the direction (Z1 direction), with each battery cell (B) interposed between the frames (F), may accommodate deformation due to swelling as the battery cell (B) is moved (e.g., slid) in the direction (Z1 direction).

As described above, as the battery cells (B) expand in the direction (Z1 direction) due to the swelling, the positions of the frames (F) may be moved along the direction (Z1 direction), and the relative positions of the input portion (SI) and the output portion (SO) of connection portion (S) which are connected to the bus bar 15 and the wiring substrate (C), respectively, on the frames (F) may be extended in the direction (Z1 direction). Accordingly, the connection portion (SC) connecting the input portion (SI) and the output portion (SO) may be forced into a deformation such as to accommodate the extension in the direction (Z1 direction). In an embodiment, since the connection portion (SC) has a curved shape including curved portions overlapping with each other, the connection portion (SC) may be easily deformed to follow the extension of the relative positions of the input portion (SI) and the output portion (SO) due to the swelling and, thus, may relieve concentration of stress accumulated in the connection portion (SC).

In FIG. 1, reference character "E" and reference numeral 210 denote an end block (E) and an end plate 210, respectively. The end block (E) and the end plate 210 may be disposed on the outer periphery of an outermost battery cell (B) to provide a fastening force for physically retaining the plurality of battery cells (B) which constitute the battery pack.

Figure 4:
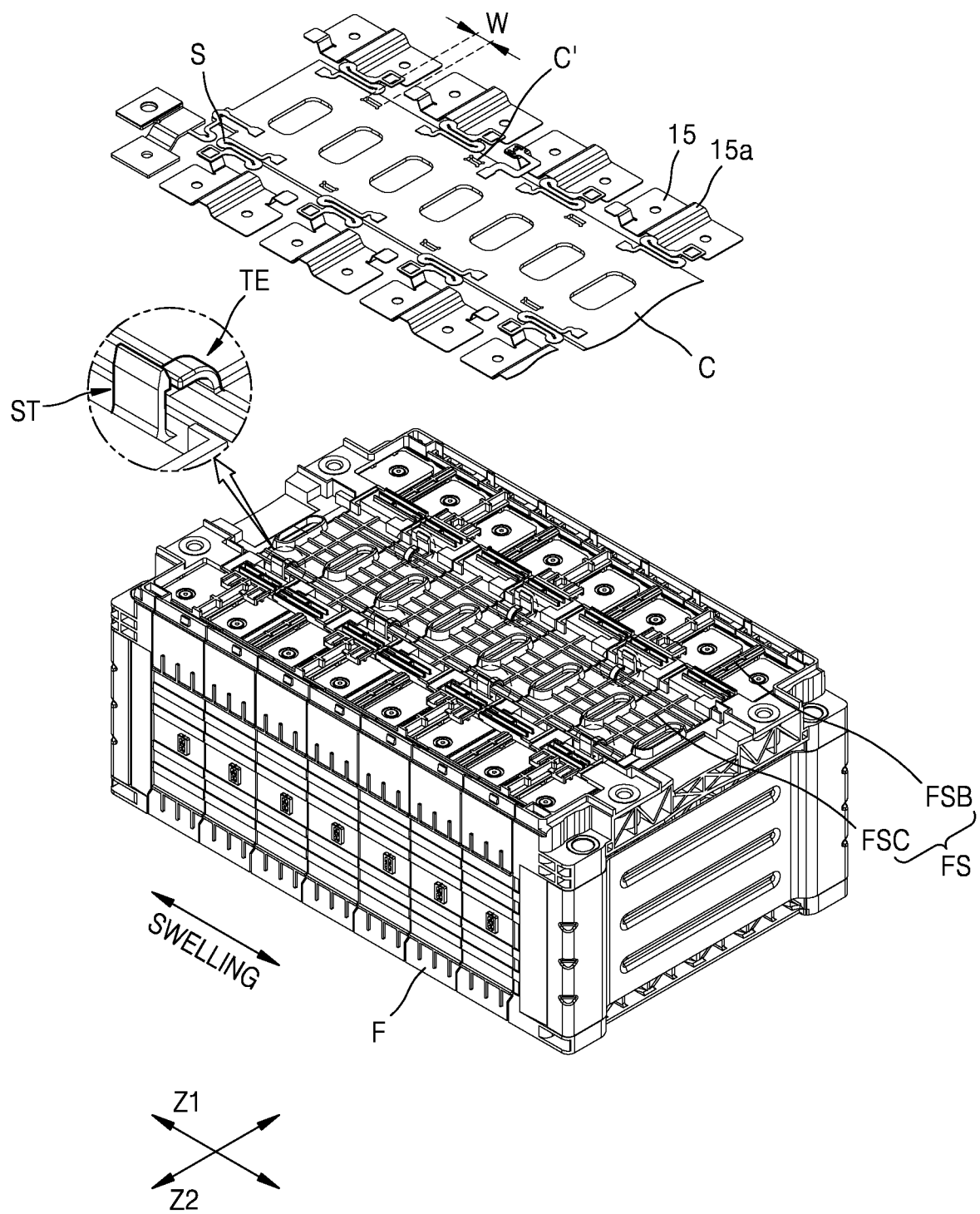
FIG. 4 is an exploded perspective view of the battery pack of FIG. 1.
Figure 5:
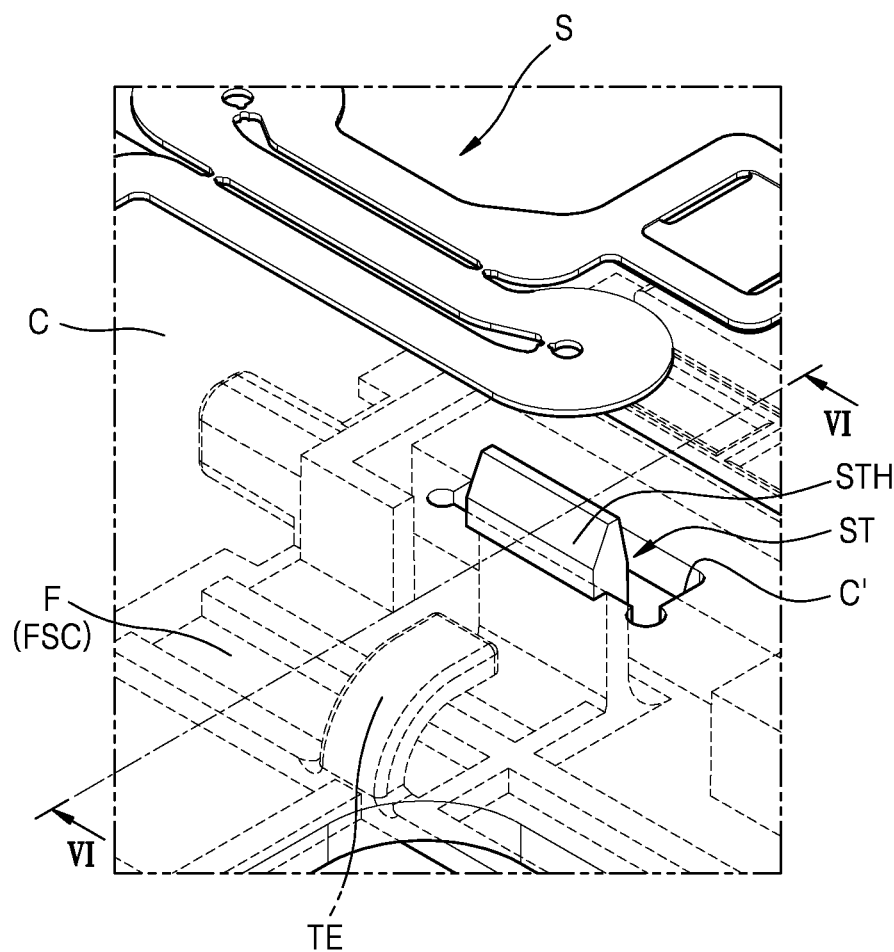
FIG. 5 is a partially enlarged perspective view of the battery pack of FIG. 4.
Figure 6:
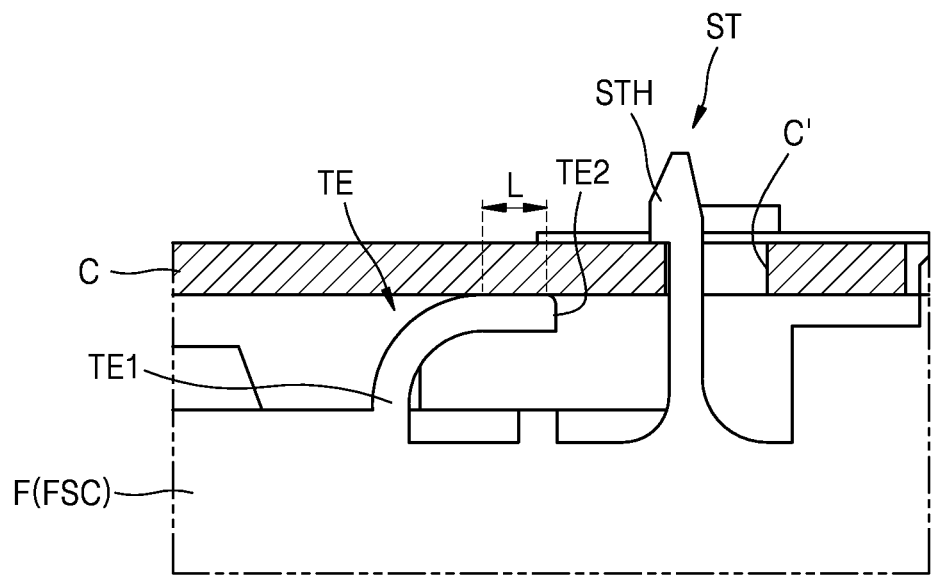
FIG. 6 is a cross-sectional view taken along the line VI-VI of FIG. 5.
Figure 7:
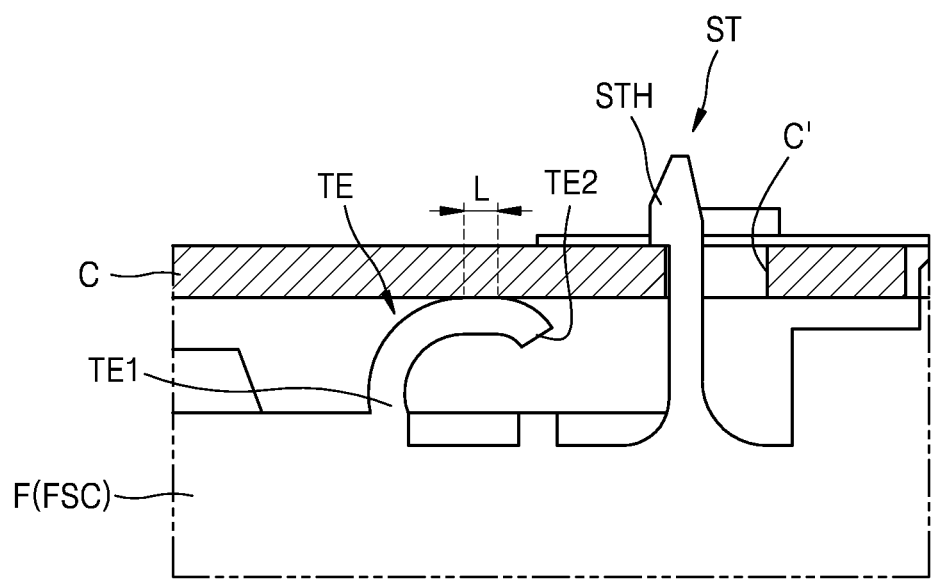
FIG. 7 is a cross-sectional view of a battery pack according another embodiment, taken along a line corresponding to the line VI-VI of FIG. 5.

FIG. 4 is an exploded perspective view of the battery pack of FIG. 1; FIG. 5 is a partially enlarged perspective view of the battery pack of FIG. 4; and FIG. 6 is a cross-sectional view taken along the line VI-VI of FIG. 5. FIG. 7 is a cross-sectional view of a battery pack according another embodiment, taken along a line corresponding to the line VI-VI of FIG. 5.

Referring to FIGS. 4 to 7, in an embodiment, each frame (F) on which the wiring substrate (C) is mounted may be provided with a latching protrusion (ST) which may press against the upper surface of the wiring substrate (C), and a tensioner (TE) which may press against a lower surface of the wiring substrate (C).

In an embodiment, the latching protrusion (ST) may be formed in the substrate support portion (FSC) on which the wiring substrate (C) may be mounted. The latching protrusion (ST) may fix the location of the wiring substrate (C) and may include a hook (STH) at a leading end thereof which may be brought into contact with the upper surface of the wiring substrate (C) by pressing. A latching portion (C') may be formed on the wiring substrate (C) to correspond to the latching protrusion (ST). In an embodiment, for example, the latching portion (C') may be formed in a hole shape. The hook (STH) formed at the leading end of the latching protrusion (ST) may be made to contact around the hole (i.e. the latching portion (C')) by pressing. That is, when the wiring substrate (C) is mounted on the substrate support portion (FSC), the latching protrusion (ST) of the substrate support portion (FSC) may be fit into the latching portion (C') formed in the form of a hole in the wiring substrate (C). The latching protrusion (ST) may pass through the latching portion (C') and be exposed to the upper surface of the wiring substrate (C), and the hook (STH) of the latching protrusion (ST) exposed to the upper surface of the wiring substrate (C) may be brought into contact around the latching portion (C') by pressing, and the latching protrusion (ST) may fix the location of the wiring substrate (C) in an upward and downward direction.

In an embodiment, through press fitting of the latching protrusion (ST) of the frame (F) (in particular, the substrate support portion (FSC) of the frame (F)) into the latching portion (C') of the wiring substrate (C), the location of the wiring substrate (C) may be fixed in the upward and downward direction. The latching protrusion (ST) may be exposed to the upper surface of the wiring substrate (C) through the latching portion (C') of the wiring substrate (C) and pressed to contact the upper surface of the wiring substrate (C), thereby providing a latching function for fixing the position of the wiring substrate (C) so as not to escape upward.

Referring to FIG. 4, the substrate support portion (FSC) formed in each frame (F) may support the wiring substrate (C). The substrate support portions (FSC) of the different frames (F) may be connected to one another in a direction (Z1 direction), providing a support surface extending along the direction as a support base for the entire wiring substrate (C).

In an embodiment, the latching protrusion (ST) may be eccentrically arranged at a position on the left or right side of the center position of each frame (F) along a left-right direction (Z2 direction). The latching protrusion (ST) may be formed on the left or right side of each frame (F), for example, on the left or right edge of the substrate support portion (FSC). In an embodiment, the latching protrusion (ST) may be formed on either one of the left and right edges of the substrate support portion (FSC) of each frame (F). When the plurality of frames (F) are connected to one another in a direction (Z1 direction), every two adjacent frames among the frames (F) may be connected such that they form a pattern in which left and right are reversed and such that the latching protrusions (ST) of the frames (F) laterally alternate between the left and right side along the direction (Z1 direction) in which the plurality of frames (F) are arranged. That is, in a structure in which the substrate support portions (FSC) of the frames (F) are connected to one another in a direction (Z1 direction), the latching protrusions (ST) may be arranged alternately at left and right positions along the direction (Z1 direction) in which the wiring substrate (C) extends. As the latching protrusions (ST) formed in the substrate support portions (FSC) of the frames (F) are brought to press against the wiring substrate (C), the location of the wiring substrate (C) may be fixed to be balanced between left and right by the latching protrusions (ST).

In an embodiment, the latching portions (C') of the wiring substrate (C) may be formed alternately at the left and right positions of the wiring substrate (C) such as to correspond to the positions of the latching protrusions (ST) of the frames (F) connected to one another in the direction (Z1 direction). For example, the wiring substrate (C) may extend along the direction (Z1 direction) in which the battery cells (B) are arranged, and a plurality of latching portions (C') may be formed in a pattern that the latching portions (C') alternate between the left and right edges of the wiring substrate (C) along the direction (Z1 direction). The number of the latching portions (C') of the wiring substrate (C) may correspond to a total number of the frames (F) over which the wiring substrate (C) extends. That is, one latching protrusion (ST) may be formed in each of the frames (F). A plurality of latching portions (C') may be formed to correspond to a total number of the frames (F) over which the wiring substrate (C) extends.

The latching protrusion (ST) may pass through a corresponding latching portion (C') of the wiring substrate (C) and be exposed to the upper surface of the wiring substrate (C). The hook (STH) at the leading end of the latching protrusion (ST) may be brought into contact with the upper surface of the wiring substrate (C) by pressing, thereby fixing the position of the wiring substrate (C) so as not to escape upward. In addition to the latching protrusion (ST), a tensioner (TE) may be formed in the substrate support portion (FSC). The tensioner (TE) may press against a lower surface of the wiring substrate (C), pushing the wiring substrate (C) upward such that the upper surface of the wiring substrate (C) presses against the latching protrusion (ST) (in particular, the hook (STH) at the leading end of the latching protrusion (ST)) to be pushed upward such as not to move downward, thereby stably fixing the position of the wiring substrate (C) in an upward and downward direction. That is, due to the tensioner (TE) and the latching protrusion (ST) pressed against the lower and upper surfaces of the wiring substrate (C), respectively, the position of the wiring substrate (C) may be stably fixed in the upward and downward direction. The tensioner (TE), which may extend in a curved shape from the substrate support portion (FSC), may press the lower surface of the wiring substrate (C) and, for example, may be in contact with the lower surface of the wiring substrate (C).

The tensioner (TE) and the latching protrusion (ST) may be at adjacent locations. Referring to FIG. 4, in an embodiment, the tensioner (TE) and the latching protrusion (ST) may be formed together to be eccentrically positioned to the left or right of the center position of each frame (F). The tensioner (TE) and the latching protrusion (ST) may be formed together at a left or right position of each of the frames (F) (in particular, the substrate support portion (FSC) of each frame (F)). When the frames (F) are connected to one another in a direction (Z1 direction), the frames (F) may be arranged to form a pattern in which left and right are reversed between adjacent frames (F), wherein the tensioner (TE) and the latching protrusion (ST) of a frame (F) may be at positions that alternate between the right and left positions with respect to those of adjacent frames (F) in the direction (Z1 direction). In an embodiment, as the tensioner (TE) and the latching protrusion (ST), which may fix the wiring substrate (C) together, are formed to alternate between the right and left positions with respect to those of adjacent frames (F) in the direction (Z1 direction) in which the wiring substrate (C) extends, the location of the wiring substrate (C) which the tensioners (TE) and the latching protrusions (ST) of the frames (F) are pressed against may be fixed to be balanced between left and right.

The tensioner (TE) and the latching protrusion (ST) may be provided at locations close to each other to be eccentric to the left or right of the center position of each of the frames (F). For example, the tensioner (TE) and the latching protrusion (ST) of a frame (F) may be formed at directly opposite positions of the frame (F). The formation of the tensioner (TE) and the latching protrusion (ST) at the directly opposite positions may mean that the tensioner (TE) and the latching protrusion (ST) are formed at adjacent positions without any intervening element between them.

The tensioner (TE) and the latching protrusion (ST) may be formed to have a protruding shape on the substrate support portion (FSC) of each frame (F), and may press against the lower and upper surfaces of the wiring substrate (C), respectively, at adjacent positions on each frame (F). The tensioner (TE) and the latching protrusion (ST) of each frame (F) may be in contact with the lower and the upper surfaces of the wiring substrate (C), respectively, thereby more stably fixing the position of the wiring substrate (C) in the upward and downward direction. By being formed at directly opposite adjacent positions, the tensioner (TE) and the latching protrusion (ST) may be in contact with the lower and upper surfaces of the wiring substrate (C), respectively, by pressing at the adjacent positions. When the tensioner (TE) and the latching protrusion (ST), which may contact the lower and upper surfaces of the wiring substrate (C), respectively, are located away from each other, a point of action on the lower surface of the wiring substrate (C) and a point of action on the upper surface of the wiring substrate (C) are also separated away from each other, and a rotational torque may be generated on the wiring substrate (C) with the distance between the points of action on the upper and lower surfaces of the wiring substrate (C) as a torque arm, causing deformation such as distortion of the wiring substrate (C).

In an embodiment, the tensioner (TE) and the latching protrusion (ST) of each frame (F) may be integrally formed with the frame (F). For example, the tensioner (TE) and the latching protrusion (ST) may be integrally formed with the frame (F) (in particular, the substrate support portion (FSC) of the frame (F)) to have a shape protruding from the frame (F). In an embodiment, for example, the tensioner (TE) and the latching protrusion (ST) may be formed of a plastic material together with the frame (F). The frame (F) formed of a plastic material may electrically and thermally insulate adjacent battery cells (B) from each other without substantially increasing the weight of the entire battery pack, and may form the exterior of the battery cell (B) with rigidity strong enough to protect the battery cell (B). The tensioner (TE) and the latching protrusion (ST), which may be formed integrally with the frame (F) to have a protruding shape, may be formed of a plastic material together with the frame (F).

Referring to FIG. 6, in an embodiment, the tensioner (TE) may be formed as an elongated member having a length and a width in which the length is longer than the width to provide an elastic force sufficient to push upward on the wiring substrate (C) when the tensioner (TE) presses against the lower surface of the wiring substrate (C). For example, a first end portion (TE1) of the tensioner (TE) may be fixed to the substrate support portion (FSC), while a second end portion (TE2) of the tensioner (TE), opposite to the first end portion (TE1), may contact the lower surface of the wiring substrate (C) to support the wiring substrate (C), wherein the tensioner (TE) may have a curved shape extending from one of the first and second end portions to the other end portion. In an embodiment, the tensioner (TE) may be formed as an elongated member having a substantially rectangular cross-section, and may be curved downward as the wiring substrate (C) is mounted thereon, providing an elastic restoring force to the wiring substrate (C) from the bending deformation.

The tensioner (TE) may be in contact with the lower surface of the wiring substrate (C). In an embodiment, a length (L) of one fifth (⅕) or more of a total length of the tensioner (TE) may be in contact with the lower surface of the wiring substrate (C). In an embodiment, the tensioner (TE) may be deformed in a curved shape from the first end portion (TE1) fixed to the frame (F) and, in particular, to the substrate support portion (FSC) of the frame (F), to the second end portion (TE2) in contact with the wiring substrate (C), wherein an elastic restoring force may be provided to the wiring substrate (C) through the second end portion (TE2). In an embodiment, about one fifth (⅕) or more, i.e. about 20% or more, of a total length of the tensioner (TE) may be in contact with the lower surface of the wiring substrate (C) to push the wiring substrate (C) upward, providing an elastic force sufficient to stably fix the position of the wiring substrate (C) together with the latching protrusion (ST) in the upward and downward direction.

In an embodiment, as shown in FIG. 6, the first end portion (TE1) of the tensioner (TE) may be fixed to the frame (F) and, in particular, to the substrate support portion (FSC) of the frame (F), while the second end portion (TE2) of the tensioner (TE) may press against the lower surface of the wiring substrate (C). In another embodiment, as shown in FIG. 7, the tensioner (TE) may extend in a curved shape from a first end portion (TE1) fixed to the frame (F) and, in particular, to the substrate support portion (FSC) of the frame (F), whereas a second end portion (TE2) of the tensioner (TE) may not contact the lower surface of the wiring substrate (C), separated from the lower surface of the wiring substrate (C). Instead, a middle portion of the tensioner (TE) between the first end portion (TE1) and the second end portion (TE2) may press against the lower surface of the wiring substrate (C). In the tensioner (TE) deformed in a curved shape with an increased curvature, the middle portion between the first end portion (TE1) and the second end portion (TE2), not the second end portion (TE2) of the tensioner (TE), may press against the wiring substrate (C) to contact the same.

Referring to FIGS. 2 and 4, in an embodiment, the battery pack according to one or more embodiments may include frames (F) which are bound facing each other with a battery cell (B) interposed between every two adjacent frames (F) in a direction (Z1 direction) in which the battery cells (B) are arranged. The battery cell (B) may experience swelling in the direction (Z1 direction) in accordance with charging and discharging operations. The frames (F) coupled to the battery cells (B) on either side of each battery cell (B) in the direction (Z1 direction), with each battery cell (B) interposed between the frames (F), may accommodate deformation due to swelling as the battery cell (B) is moved (e.g., slid) in the direction (Z1 direction). In an embodiment, as the battery cell (B) swells in the direction (Z1 direction), the frames (F) coupled to the battery cells (B) on either side of each battery cell (B) in the direction (Z1 direction) may move (e.g., slide) in the direction (Z1 direction), such that relative positions of the latching protrusions (ST) in the frames (F) (in particular, in the substrate support portions (FSC) of the frames (F)) may be moved. That is, the relative positions of the latching protrusions (ST) in the frames (F) (in particular, in the substrate support portions (FSC) of the frames (F)) with respect to the wiring substrate (C) may be moved in the direction (Z1 direction). Accordingly, to allow such a positional movement of the latching protrusions (ST), the latching portions (C') of the wiring substrate (C) may be formed as an elongated hole having an elongated width (W) along the direction (Z1 direction).

For example, a pair of frames (F) bound facing each other with a battery cell (B) therebetween may move away from each other along the direction (Z1 direction) as the battery cell (B) swells. As a result, a pair of latching protrusions (ST) in the pair of frames (F) may also move away from each other along the direction (Z1 direction). In an embodiment, the positions of the adjacent latching protrusions (ST) of the adjacent frames (F) may move away from each other along the direction (Z1 direction) as the battery cell (B) swells. Accordingly, the width (W) of each latching portion (C') in the wiring substrate (C) may be formed to extend along the direction (Z1 direction) so as to allow the positional movement of the latching protrusions (ST) which are engaged in the latching portions (C'). If the latching portion (C') of the wiring substrate (C) is formed without consideration of the swelling of the battery cell (B) to have a width (W) which is large enough to engage with the latching protrusion (ST) but not sufficient to accommodate the swelling of the battery cell (B), the latching protrusions (ST) engaged with the latching portions (C') of the wiring substrate (C) may be subjected to a stress exerted in a direction away from each other as the battery cell (B) swells. Accordingly, the latching portions (C') formed along a lengthwise direction of the wiring substrate (C) may also be subjected to a stress exerted in a direction away from each other, such that the wiring substrate (C) may be deformed to be curved, or the wiring substrate (C) or a conductive pattern (not shown) in the wiring substrate (C) or a plurality of circuit devices (not shown) mounted on the wiring substrate (C) may be damaged due to the stress repeatedly exerted thereon due to the swelling of the battery cell (B).

In the entire battery pack including a plurality of battery cells (B), a positional shift of a latching protrusion (ST) caused due to battery cell swelling may result from cumulative swelling of the plurality of battery cells, depending on the position of the corresponding latching protrusion (ST). Accordingly, the widths (W) of the latching portions (C') formed in the wiring substrate (C) to correspond to the locations of the latching protrusions (ST) may have a cumulatively increasing pattern in the direction (Z1 direction). This will be described later in greater detail.

Figure 8:
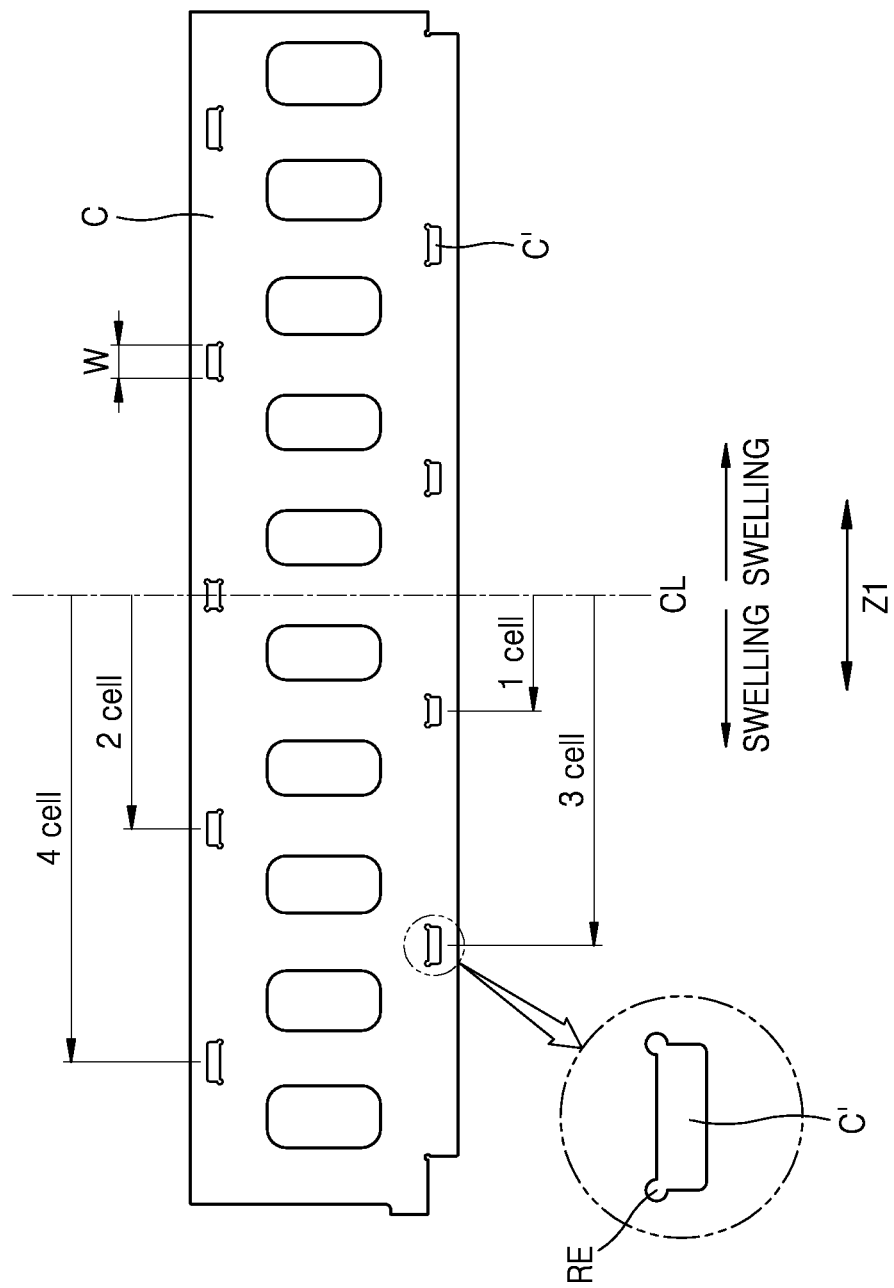
FIG. 8 is a view illustrating a shape of latching portions provided in a wiring substrate.
Figure 9:
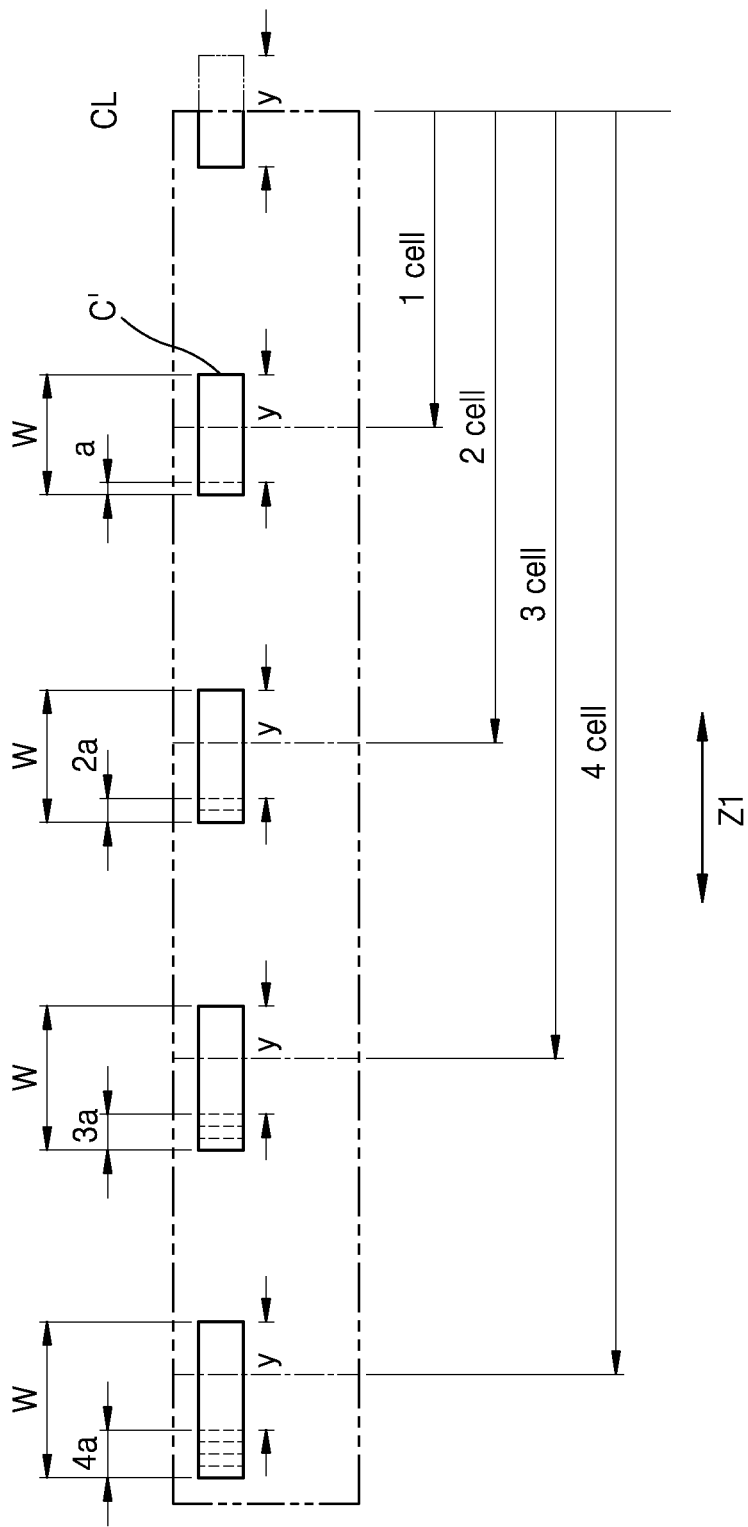
FIG. 9 is a schematic view of the latching portions in FIG. 8 for explaining a design of the latching portions.

FIG. 8 is a view illustrating a shape of a latching portion (C') provided in the wiring substrate (C); and FIG. 9 is a schematic view of the latching portions (C') in FIG. 8 for explaining a design of the latching portions (C').

Referring to FIGS. 8 and 9, with the assumption that there is no positional shift at a central reference line (CL) bisecting battery cells (B) along a direction (Z1 direction), the battery cells (B) on a front side and the battery cells (B) on a rear side from the central reference line (CL) may swell along a direction away from the central reference line (CL). In an embodiment, the latching portions (C') spaced increasingly away from the central reference line (CL) may have cumulatively increasing tolerances (a, 2a, 3a, and 4a), respectively, with increasing distance from the central reference line (CL). For example, a width (W) of a latching portion (C') that is spaced from the central reference line (CL) by a width of one cell (1 cell) may be designed to be equal to the sum of a width (y) of the center latching portion (C') across the central reference line (CL) and a tolerance (a) corresponding to a degree of swelling of one cell. A width (W) of a latching portion (C') that is spaced from the central reference line (CL) by a width of two cells (2 cells) may be designed to be equal to the sum of the width (y) of the center latching portion (C') across the central reference line (CL) and a tolerance (2a) corresponding to a degree of swelling of two cells. Similarly, a width (W) of a latching portion (C') that is spaced from the central reference line (CL) by a width of three cells (3 cells) may be designed to be equal to the sum of the width (y) of the center latching portion (C') across the central reference line (CL) and a tolerance (3a) corresponding to a degree of swelling of three cells. A width (W) of a latching portion (C') that is spaced from the central reference line (CL) by a width of four cells (4 cells) may be designed to be equal to the sum of the width (y) of the center latching portion (C') across the central reference line (CL) and a tolerance (4a) corresponding to a degree of swelling of four cells. As used herein, the center latching portion (C') on the central reference line (CL) may refer to a latching portion (C') across the central reference line (CL) at a center position, bisecting the battery cells (B) along a direction (Z1 direction). Since there is no positional shift on the central reference line (CL) caused due to the swelling of the battery cell (B), the width (y) of the center latching portion (C') on the central reference line (CL) may be determined merely to allow a corresponding latching protrusion (ST) to be fitted thereinto without consideration of a tolerance. The widths (W) of the latching portions (C') spaced increasingly away from the central reference line (CL) may increase along the direction (Z1 direction) by gradually increasing tolerances (a, 2a, 3a, and 4a), respectively, with increasing distances from the central reference line (CL). In an embodiment, overall, the widths (W) of the latching portions (C') in the wiring substrate (C) may be symmetrical with respect to the central reference line (CL). For example, latching portions (C') arranged on a front side with respect to the central reference line (CL) may have gradually increasing widths (W) forward to which cumulative tolerances (a, 2a, 3a, and 4a) have been added, respectively, while latching portions (C') arranged on a rear side with respect to the central reference line (CL) may have gradually increasing widths (W) rearward to which cumulative tolerances (a, 2a, 3a, and 4a) have been added, respectively. Accordingly, the distance between adjacent two of the latching portions (C') on the front or rear side with respect to the central reference line (CL) may be gradually reduced forward or rearward.

As described above, according to one or more embodiments, the position of the wiring substrate (C) may be fixed in an upward and downward direction through fit coupling between the latching protrusions (ST) of the frames (F) and the latching portions (C') of the wiring substrate (C), while positional movement of the latching protrusions (ST) due to the swelling of the battery cells (B) may be allowed in a direction (Z1 direction) to block generation of stress due to the swelling of the battery cells (B) and prevent or substantially prevent warping or damage of the wiring substrate (C) due to the stress generation. For example, in designing the latching portions (C') of the wiring substrate (C), in order to allow positional movement of the latching protrusions (ST), the latching portions (C') may be designed in the form of an elongated hole that becomes gradually longer along the direction (Z1 direction) due to gradually increasing tolerances (a, 2a, 3a, and 4a) added thereto with increasing distances away from the central reference line (CL) bisecting the plurality of battery cells (B), such that the latching portions (C') formed as elongated holes extending along the direction (Z1 direction) may allow the positional movement of the latching protrusions (ST) due to the swelling of the battery cells (B).

In the embodiment of FIG. 9, a plurality of latching portions (C') may be arranged along either one of the left and right sides of the wiring substrate (C). However, this is merely for convenience of understanding. In some embodiments, as illustrated in FIG. 8, the latching portions (C') may be arranged in a pattern that the latching portions alternate between left and right along a lengthwise direction (a forward and rearward direction) of the wiring substrate (C).

In the embodiment of FIG. 9, the latching portions (C') may have an angular shape. However, this is merely for convenience of understanding. In some embodiments, as illustrated in FIG. 8, the latching portions (C') may have round edges (RE). As described above, to suppress the generation of stress caused by the latching protrusions (ST) caught in the latching portions (C'), a width (W) of each latching portion (C') in the wiring substrate (C) may be designed to be equal to the sum of the width (y) of the center latching portion (C') at the center of the wiring substrate (C) in the direction (Z1 direction) and a cumulatively increasing tolerance (a, 2a, 3a, or 4a) according to the location of the corresponding latching portion (C'). Further, by designing the latching portions (C') to have round edges (RE), it may be possible to prevent or substantially prevent stress concentration due to the latching protrusions (ST) caught in the latching portions (C') and breakage of the wiring substrate (C) which may occur due to the stress concentration.

As described above, according to one or more embodiments, the position of a wiring substrate for obtaining and collecting status information of a plurality of battery cells may be stably fixed. Therefore, it may be possible to obtain accurate status information from the battery cells, to rapidly detect and respond to an abnormal situation of the battery cells, and to precisely control charging and discharging operations of the battery cells.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as set forth by the following claims.

What is claimed is:

1. A battery pack comprising:
a plurality of battery cells;
a plurality of frames each between two adjacent battery cells among the battery cells in a direction, wherein the frames are coupled to and face each other; and
a wiring substrate mounted on the frames and configured to collect status information of the battery cells from the battery cells,
wherein each of the frames comprises a latching protrusion and a tensioner which protrude therefrom and press against an upper surface and a lower surface of the wiring substrate, respectively.

2. The battery pack of claim 1, wherein the wiring substrate comprises a plurality of latching portions into which the latching protrusions of the frames are fitted.

3. The battery pack of claim 2, wherein a latching portion of the plurality of latching portions comprises a hole, and the latching protrusion presses against the upper surface of the wiring substrate through the latching portion.

4. The battery pack of claim 1, wherein the latching protrusion and the tensioner directly face each other and are provided at locations close to each other.

5. The battery pack of claim 4, wherein the latching protrusion and the tensioner are provided together eccentrically located to the left or right of a center position of each of the frames.

6. The battery pack of claim 5, wherein the frames are arranged in a pattern that reverses between left and right along the direction, and
the locations of the latching protrusion and the tensioner in each of the frames alternate between left and right positions along the direction.

7. The battery pack of claim 6, wherein the latching portions into which the latching protrusions are fitted are alternately formed at left and right edge positions of the wiring substrate along a direction in which the wiring substrate extends.

8. The battery pack of claim 1, wherein the latching protrusions of adjacent frames among the frames arranged in the direction move away from each other along the direction as the battery cells swell.

9. The battery pack of claim 8, wherein the wiring substrate comprises latching portions into which the latching protrusions of the frames are fitted, and
widths of the latching portions in the direction gradually increase and have cumulatively increasing tolerances with increasing distance from a central reference line bisecting the plurality of battery cells arranged in the direction.

10. The battery pack of claim 1, wherein the latching protrusion and the tensioner are integrally formed with each of the frames.

11. The battery pack of claim 10, wherein the tensioners comprise a plastic material.

12. The battery pack of claim 1, wherein the tensioner is in contact with the lower surface of the wiring substrate.

13. The battery pack of claim 1, wherein the tensioner comprises a first end portion fixed to the frame, and a second end portion which presses against the lower surface of the wiring substrate, and the tensioner extends with a curved shape from the first end portion to the second end portion.

14. The battery pack of claim 1, wherein the tensioner comprises an elongated member having a length and a width in which the length is longer than the width, and the tensioner elastically presses against the lower surface of the wiring substrate.

15. The battery pack of claim 1, wherein each of the frames comprises:
a substrate support portion on which the wiring substrate is mounted; and
a bus bar support portion on either one of a left side and a right side of the substrate support portion.

16. The battery pack of claim 15, wherein the bus bar support portion has a relatively small width with respect to that of the substrate support portion.

* * * * *